United States Patent
Osogami et al.

(10) Patent No.: US 11,625,631 B2
(45) Date of Patent: *Apr. 11, 2023

(54) COMPUTATIONAL ESTIMATION OF A CHARACTERISTIC OF A POSTERIOR DISTRIBUTION

(71) Applicant: INTERNATIONAL BUSINESS MACHINES CORPORATION, Armonk, NY (US)

(72) Inventors: Takayuki Osogami, Tokyo (JP); Rudy Raymond Harry Putra, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 320 days.

This patent is subject to a terminal disclaimer.

(21) Appl. No.: 16/582,281

(22) Filed: Sep. 25, 2019

(65) Prior Publication Data
US 2020/0019878 A1 Jan. 16, 2020

Related U.S. Application Data

(63) Continuation of application No. 14/841,585, filed on Aug. 31, 2015, now Pat. No. 10,535,012.

(51) Int. Cl.
*G06N 7/00* (2023.01)

(52) U.S. Cl.
CPC ................... *G06N 7/005* (2013.01)

(58) Field of Classification Search
CPC ....... G06N 7/005; G06N 99/005; G06F 19/24
See application file for complete search history.

(56) References Cited

U.S. PATENT DOCUMENTS 8,255,263 B2 * 8/2012 Smallwood ........ G06Q 30/0201
705/7.29
8,510,049 B2 8/2013 Williams
(Continued)

OTHER PUBLICATIONS

Sanjay Pant and Damiano Lombardi, "An information-theoretic approach to assess practical identifiability of parametric dynamical systems", Aug. 17, 2015, Mathematical Biosciences 268 (2015), pp. 66-79. (Year: 2015).*

(Continued)

*Primary Examiner* — Ying Yu Chen
(74) *Attorney, Agent, or Firm* — Tutunjian & Bitetto, P.C.; Kurt Goudy (57) ABSTRACT

An apparatus for implementing a computing system to predict preferences includes at least one processor device operatively coupled to a memory. The at least one processor device is configured to calculate a parameter relating to a density of a prior distribution at each sample of a set of samples associated with the prior distribution. The at least one parameter including a distance from each sample to at least one neighboring sample. The at least one processor device is further configured to estimate, for the plurality of samples, at least one differential entropy of at least one posterior distribution associated with at least one observation based on the parameter relating to the density of the prior distribution at each sample and the likelihood of observation for each sample. The estimation is performed without sampling the at least one posterior distribution to reduce consumption of resources of the computing system.

20 Claims, 6 Drawing Sheets

(56) References Cited

U.S. PATENT DOCUMENTS

| | | | | |
|---|---|---|---|---|
| 8,589,319 B2* | 11/2013 | Balakrishnan | ......... | G06N 20/00 706/14 |
| 2011/0060708 A1* | 3/2011 | Suzuki | ................... | G06N 20/00 706/12 |

OTHER PUBLICATIONS

Jiri Ajgl and Miroslav Simandl, "Differential entropy estimation by particles", 2011, Proceedings of the 18th World Congress The International Federation of Automatic Control, pp. 11991-11996. (Year: 2011).*

Maya Gupta and Santosh Srivastava, "Parametric Bayesian Estimation of Differential Entropy and Relative Entropy", 2010, Entropy, vol. 12, Issue4, pp. 818-843. (Year: 2010).*

Andoni, et al., "Near-Optimal Hashing Algorithms for Approximate Nearest Neighbor in High Dimensions", Foundations of Computer Science, IEEE, Oct. 2006, pp. 1-10.

Beirlant, et al., "Nonparametric Entropy Estimation: An Overview", International Journal of Mathematical and Statistical Sciences 6.1, 1997. pp. 1-14.

Gupta, et al., "Parametric Bayesian Estimation of Differential Entropy and Relative Entropy" Entropy, vol. 12, Issue 4. Apr. 2010. pp. 818-843.

Indyk, et al., "Approximate Nearest Neighbors: Towards Removing the Curse if Dimensionality", STOC '98 Proceedings of the thirtieth Annual ACM symposium on Theory of Computing, Apr. 1998. pp. 1-20.

Mardia, et al., "Multivariate Analysis", Academic Press, London, 1979, 2 pages.

Roweis, et al., "Nonlinear Dimensionality Reduction by Locally Linear Embedding", Science, vol. 290. Dec. 2000. pp. 2323-2326.

Saul, et al., "An Introduction to Locally Linear Embedding", Locally Linear Embedding (LLE) Publications. Jan. 2000. pp. 1-13. Available at: https://www.cs.nyu.edu/~roweis/lle/papers/lleintro.pdf.

Shen, et al., "Adaptive Bayesian Procedures Using Random Series Priors", Scandinavian Journal of Statistics, Sep. 2015, pp. 1-30.

Tenenbaum, et al., "A Global Geometric Framework for Nonlinear Dimensionality Reduction", Science, vol. 290. Dec. 2000. pp. 2319-2323.

Vaidya, Pravin M. "An O( n log n) Algorithm for the All-Nearest-Neighbors Problem", Discrete & Computational Geometry, vol. 4, Issue 1. Dec. 1989. pp. 101-115.

List of IBM Patents or Patent Applications Treated as Related dated Sep. 25, 2019, 2 pages.

* cited by examiner

|  | $D_1$ | $D_2$ | ■ ■ ■ ■ ■ | $D_M$ |
|---|---|---|---|---|
| $X_1$ | $p(D_1|X_1)$ | $p(D_2|X_1)$ | ■ ■ ■ ■ ■ | $p(D_M|X_1)$ |
| $X_2$ | $p(D_1|X_2)$ | $p(D_2|X_2)$ | ■ ■ ■ ■ ■ | $p(D_M|X_2)$ |
| ⋮ | ⋮ | ⋮ |  | ⋮ |
| $X_n$ | $p(D_1|X_n)$ | $p(D_2|X_n)$ | ■ ■ ■ ■ ■ | $p(D_M|X_n)$ |

*FIG.4*

| Observation | Differential Entropies |
|---|---|
| Observation $D_1$ | 0.24 |
| Observation $D_2$ | 0.64 |
| ⋮ | ⋮ |
| Observation $D_n$ | 0.41 |

COMPUTATIONAL ESTIMATION OF A CHARACTERISTIC OF A POSTERIOR DISTRIBUTION

BACKGROUND

Technical Field

The present invention relates to estimating a characteristic of a posterior distribution for a plurality of samples.

Related Art

Estimating values of a plurality of variables is important in interactive cognitive systems. For example, a user's likelihood of preferring certain features of a product, such as price, functionality, durability, etc., can be estimated. Such user preferences are typically represented by high-dimensional vectors, such as feature vectors, and can be represented with a probability (posterior) distribution on a metric space. Some characteristics, such as differential entropy, of the probability distribution can be used to measure how reliably a user's preference has been predicted.

However, analytical solutions for estimating the characteristics of the posterior distribution have been limited. One approach is to generate samples from the posterior distribution by the use of Markov Chain Monte Carlo (MCMC) algorithms for every possible observation, and estimate the differential entropy from those samples. However, repetitive MCMC generation of samples for each hypothetical observation and computation of differential entropy values under this approach is often time consuming, and is computationally expensive.

SUMMARY

Therefore, it is an object of an aspect of the innovations herein to provide an apparatus capable of overcoming the above drawbacks accompanying the related art. The above and other objects can be achieved by the combinations recited in the claims. A first aspect of the innovations may include an apparatus for estimating a characteristic of a posterior distribution. The apparatus includes a sampling section configured to generate a plurality of samples from a prior distribution, an obtaining section configured to obtain, for each sample among the plurality of samples, a likelihood of observation given the sample, a calculation section configured to calculate a parameter relating to a density at each sample in the prior distribution, and an estimation section configured to estimate, for the plurality of samples, a characteristic of the posterior distribution based on the parameter relating to the density at each sample and the likelihood of observation for each sample. The present principles may also include a computer-implemented method performed by the apparatus, and, a computer program product comprising a non-transitory computer readable storage medium having program instructions embodied therewith, the program instructions executable by the apparatus.

A second aspect of the innovations may include an apparatus for implementing a computing system to predict preferences. The apparatus includes at least one processor device operatively coupled to a memory. The at least one processor device is configured to calculate a parameter relating to a density of a prior distribution at each sample of a set of samples associated with the prior distribution. The at least one parameter including a distance from each sample to at least one neighboring sample. The at least one processor device is further configured to estimate, for the plurality of samples, at least one differential entropy of at least one posterior distribution associated with at least one observation based on the parameter relating to the density of the prior distribution at each sample and the likelihood of observation for each sample. The estimation is performed without sampling the at least one posterior distribution to reduce consumption of resources of the computing system. The present principles may also include a computer-implemented method performed by the apparatus, and, a computer program product comprising a non-transitory computer readable storage medium having program instructions embodied therewith, the program instructions executable by the apparatus.

The summary clause does not necessarily describe all of the features of the embodiments of the present invention. The present invention may also be a sub-combination of the features described above. The above and other features and advantages of the present invention will become more apparent from the following description of the embodiments, taken in conjunction with the accompanying drawings.

DETAILED DESCRIPTION OF THE EMBODIMENTS

The descriptions of the various embodiments, including example embodiments, of the present invention will be described. The embodiments described herein are not intended to limit the claims, and not all of the features described in the embodiments are necessarily essential to the invention.

Figure 1:
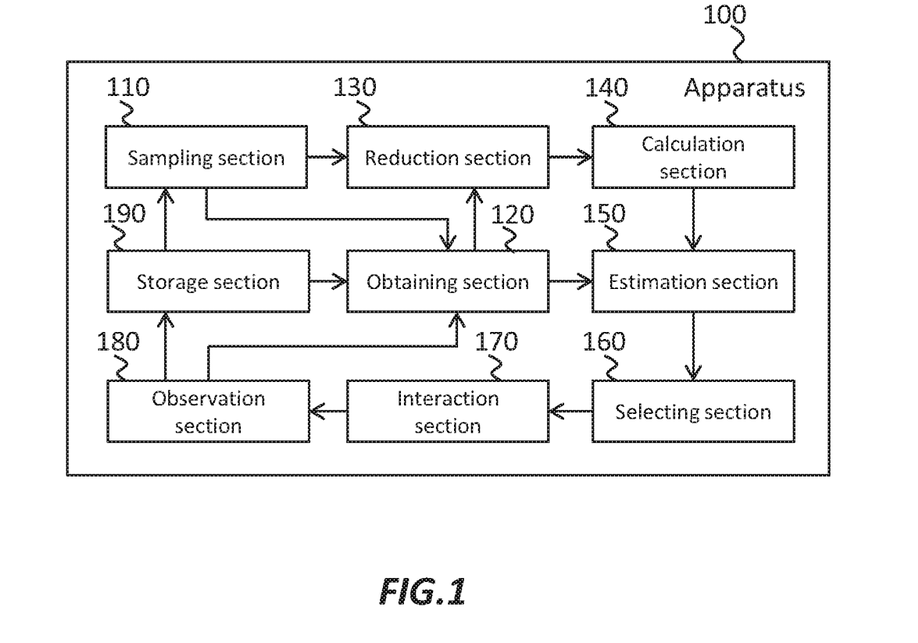
FIG. 1 shows an exemplary configuration of an apparatus, according to an embodiment.

With reference now to FIG. 1, FIG. 1 shows a block diagram of an apparatus 100, according to one embodiment of the present principles. The apparatus 100 may estimate characteristics, such as differential entropy, of a posterior distribution based on samples from a prior distribution. The apparatus 100 may include a sampling section 110, an obtaining section 120, a reduction section 130, a calculation section 140, an estimation section 150, a selecting section 160, an interaction section 170, an observation section 180, and a storage section 190.

The sampling section 110 may be configured to generate a plurality of samples from a prior distribution. In one embodiment, the prior distribution may be a distribution of values of a feature vector representing a preference of a user or a group of users, which may represent a degree of likelihood that the user (or the group) prefers a specific item. The sampling section 110 may obtain samples from the prior distribution stored in a storage section 190. The sampling section 110 may provide the plurality of samples to the obtaining section 120 and the reduction section 130.

The obtaining section 120 may be configured to obtain, for each sample among the plurality of samples, a likelihood of observation given the sample. The obtaining section 120 may obtain a likelihood of observation from a model having an internal state estimated by the prior distribution under the condition of each sample of the plurality of samples. In one embodiment, the obtaining section 120 may obtain a likelihood function that outputs a value of a likelihood for each sample, from the storage section 190. Then, the obtaining section 120 may obtain values of the likelihood for each sample by utilizing the likelihood function. The obtaining section 120 may obtain the likelihood for a plurality of observations. The obtaining section 120 may provide the reduction section 130 and the estimation section 150 with the likelihood of observation.

The reduction section 130 may be configured to reduce an amount of samples after generation by the sampling section 110 based on the likelihood of observation for each sample of the plurality of samples. In one embodiment, the reduction section 130 may eliminate each sample having a likelihood of observation that is less than a threshold likelihood. The reduction section 130 may provide the calculation section 140 with the remaining samples after the elimination.

The calculation section 140 may be configured to calculate a parameter relating to a density at each sample in the prior distribution. The calculation section 140 may use the remaining samples from the reduction section 130 or the original samples from the sampling section 110. Details of the calculation performed by the calculation section 140 are explained in further detail below. The calculation section 140 may provide the estimation section 150 with a parameter relating to the density.

The estimation section 150 may be configured to estimate, for the plurality of samples, a characteristic of the posterior distribution based on the parameter relating to the density at each sample and the likelihood of observation for each sample. In one embodiment, the estimation section 150 may estimate the quality of the posterior distribution as the characteristic of the posterior distribution. For example, the estimation section 150 may estimate a differential entropy of the posterior distribution as the characteristic of the posterior distribution.

The estimation section 150 may estimate a differential entropy of each of a plurality of posterior distributions as the characteristic of each of the plurality of posterior distributions. The details of the estimation of the estimation section 150 are explained in further detail below. The estimation section 150 may provide the selecting section 160 with the characteristic of the posterior distribution.

The selecting section 160 may be configured to select an action from a plurality of candidate actions based on the characteristic of the posterior distribution corresponding to each observation caused by each candidate action. In one embodiment, the selecting section 160 may select an action that gives the lowest expected differential entropy, among the plurality of the candidate actions. The selecting section 160 may provide the interaction section 170 with the selected action.

The interaction section 170 may be configured to generate an interaction with the person based on the selected action from the selecting section 160. For example, the interaction section 170 may send an email, output an onscreen message, etc. to a user to persuade the user to purchase an item. The interaction section 170 may send a notification that the interaction has been generated to the observation section 180.

The observation section 180 may be configured to obtain an observation from a model having an internal state estimated by the prior distribution. The model may be a behavioral model of a person, such as the user, who receives the interaction of the interaction section 170. The observation section 180 may provide the obtaining section 120 with the obtained observation. The observation section 180 may further store the obtained observation in the storage section 190.

The storage section 190 may store samples of a prior distribution, information of the likelihood of observation, the observations, etc. The storage section 190 may store further information, such as programs, etc., needed for operations of the apparatus 100, providing elements of the apparatus 100 with the information, and receiving information from the elements. The storage section 190 may be a computer readable storage medium such as an electric storage device, a magnetic storage device, an optical storage device, an electromagnetic storage device, a semiconductor storage device, etc.

Each of the sampling section 110, the obtaining section 120, the reduction section 130, the calculation section 140, the estimation section 150, the selecting section 160, the interaction section 170, and the observation section 180 may be a circuit, a shared or dedicated computer readable medium storing computer readable program instructions executable by a shared or dedicated processor, etc.

The apparatus 100 may estimate characteristics, such as differential entropy, of a posterior distribution by utilizing samples from a prior distribution and a likelihood of observation, without sampling from the posterior distribution. Thereby, the apparatus 100 may reduce the amount of computation, such as reduced processor usage and/or reduced memory consumption, in obtaining the characteristic of the posterior distribution, even when compared to state-of-the-art computational techniques, such as computation of differential entropy values from repetitive MCMC generation of samples for each hypothetical observation.

In some embodiments, the storage section 190 may be implemented within a housing of the apparatus 100, while in other embodiments the storage section 190 may be outside the housing of the apparatus 100, such as across a communication network from the apparatus 100.

Figure 2:
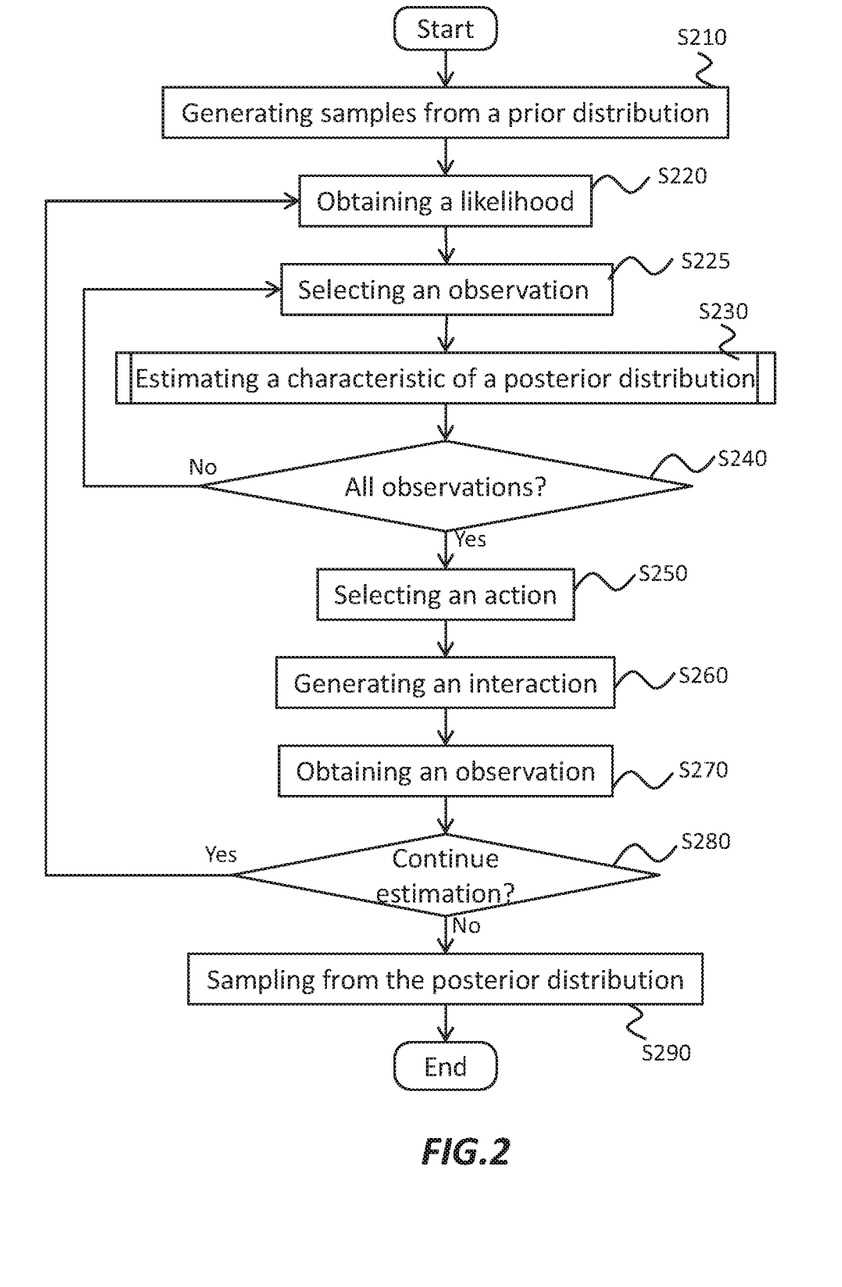
FIG. 2 shows a method for estimating a characteristic of a posterior distribution, according to an embodiment.

FIG. 2 shows a method for estimating a characteristic of a posterior distribution, according to an embodiment of the present invention. The present embodiment describes an example in which an apparatus, such as the apparatus 100, performs the operations from S210 to S290 shown in FIG. 2. FIG. 2 shows one example of the operational flow of the apparatus 100 shown in FIG. 1, but the apparatus 100 shown in FIG. 1 is not limited to using this operational flow. Also, the operational flow in FIG. 2 may be performed by other embodiments of an apparatus.

First, at S210, a sampling section, such as the sampling section 110, may generate a plurality of samples from a prior distribution stored in a storage section, such as the storage section 190. In one embodiment, the storage section may preliminarily store samples of feature vectors having k dimensions. The feature vectors may represent characteristics (e.g., preference, tendency, quality, property, etc.) of a person (e.g., user, client, etc.). The sampling section may generate samples X ($X_i \in X$, i=1, 2, . . . , n) from the prior distribution. The sampling section may provide the generated samples X to an obtaining section and a reduction section.

Next, at S220, an obtaining section, such as the obtaining section 120, may obtain information of a likelihood of observation that occurs in the context of each of the plurality of samples X generated at S210. A transition from a prior distribution to a posterior distribution occurs for each sample in response to a particular observation. Thus, the obtaining section may obtain a likelihood that the particular observation, D, is made for each sample. The obtaining section may obtain a plurality of likelihoods of n different observations ($p(D|X_i)$, i=1, ..., n), which correspond to n different samples. In the embodiment, the obtaining section may obtain a likelihood function $p(D|X_i)$ that inputs a sample $X_i$ and outputs a likelihood that the particular observation D is made in the context of the sample $X_i$.

The obtaining section may calculate values of a likelihood for the plurality of samples by inputting a sample $X_i$ into the likelihood function $p(D_m|x)$ for each observation $D_m$. The obtaining section may provide a reduction section, such as the reduction section 130, and an estimation section, such as the estimation section 150, with the calculated values of the likelihood of observation for each sample $X_i$, and may store the calculated values in a storage section, such as the storage section 190.

Next, at S225, the estimation section may select an observation from the plurality of observations D. In the embodiment, the estimation section may select an observation $D_m$. An integer m may be first set to be 1, then may be incremented by 1 at the end of each loop of S225-S240. Thereby, the estimation section performs S230 for each of the observations D. The estimation section may or may not select an observation that has been selected at S250.

Next, at S230, the estimation section may estimate a characteristic of the posterior distribution, such as entropy (e.g., differential entropy, etc.) of the posterior distribution, based on the parameter relating to the density at each sample of the plurality of samples and the likelihood of observation for each sample of the plurality of samples. A more detailed example of such estimation is explained with respect to FIG. 3. The estimation section may provide a selecting section with one or more of the characteristics of the posterior distribution.

Next, at S240, the estimation section may determine whether characteristics of all of the plurality of observations D have been estimated. If the decision is positive, then the estimation section may proceed with S250 and set the integer m to 1, and if negative, then the estimation section returns to S225 to estimate the characteristic of a not-yet-selected observation. By looping S225-S240, the estimation section may estimate characteristics of the posterior distributions of the plurality of different observations D, each observation corresponding to one of the particular observations.

Next, at S250, a selecting section, such as the selecting section 160, selects an action from a plurality of candidate actions based on the characteristic of the posterior distribution corresponding to each observation caused by each candidate action. In one embodiment, the selecting section 160 may select an action, such that an expected value of differential entropies of all possible observations caused by the action is lower than a threshold, or the expected value is the lowest among candidate actions. Thereby, the selecting section may select an action that may enable estimation of a reliable feature vector. The selecting section may provide an interaction section, such as the interaction section 170, with the selected action.

Next, at S260, the interaction section generates an interaction with the person based on the action selected by the selecting section. In one embodiment, the interaction section may take the selected action that may cause one or more of observations. For example, if the observation is a purchase of a specific item, the interaction section may send an email advertising the item to a user or a group of users. For example, if the observations are possible answers to a question, the interaction section may send the question to a user or a group of user. The interaction section may send a notification that the interaction has been generated to an observation section, such as the observation section 180.

Next, at S270, the observation section may obtain an observation from a model having an internal state estimated by the prior distribution. The observation section may provide the obtaining section with the obtained observation, thereby enabling the obtaining section to obtain a likelihood of further observation for each sample after the observation at S220.

Next, at S280, the obtaining section may determine whether to continue the estimation of characteristic of the posterior distribution. In one embodiment, if there are any actions that have not been selected at S250, then the obtaining section may determine to continue the estimation. In one embodiment, if a predetermined number of iterations of S220-S280 has been completed and/or a predetermined time has been passed, then the obtaining section may determine to end the estimation. If the decision is positive, then the obtaining section may return to S220 to obtain the likelihood reflecting the observation made at the last iteration of S270. For example, if an observation $D_1$ is observed at the first iteration of S270, then the obtaining section may obtain a likelihood function $p(D_1D_2|x)$ for the observation $D_2$ and a likelihood function $p(D_1D_3|x)$ for the observation $D_3$ at the next iteration of S220. If the decision is negative, then the obtaining section may proceed with S290.

At S290, the sampling section may generate a plurality of samples from the posterior distribution reflecting the result of observation at S270. The sampling section may generate the plurality of samples by using a Markov Chain Monte Carlo method based on the samples from the prior distribution generated at S210 and the likelihood function obtained at S220. According to the embodiment, the sampling section may generate highly reliable samples from the posterior distribution, once estimation of all the actions has been completed.

As described above, an apparatus, such as the apparatus 100, can estimate characteristics, such as differential entropy, of posterior distributions without sampling the posterior distribution, which often consumes many computational resources. By looping S225-S240, the estimation section may estimate the characteristic of a posterior distribution based on the parameter relating to the density at each sample in the prior distribution generated at S210 and the likelihood of observation for each sample obtained at S220. In some embodiments, the apparatus may not perform one or more of S260-S290.

Figure 3:
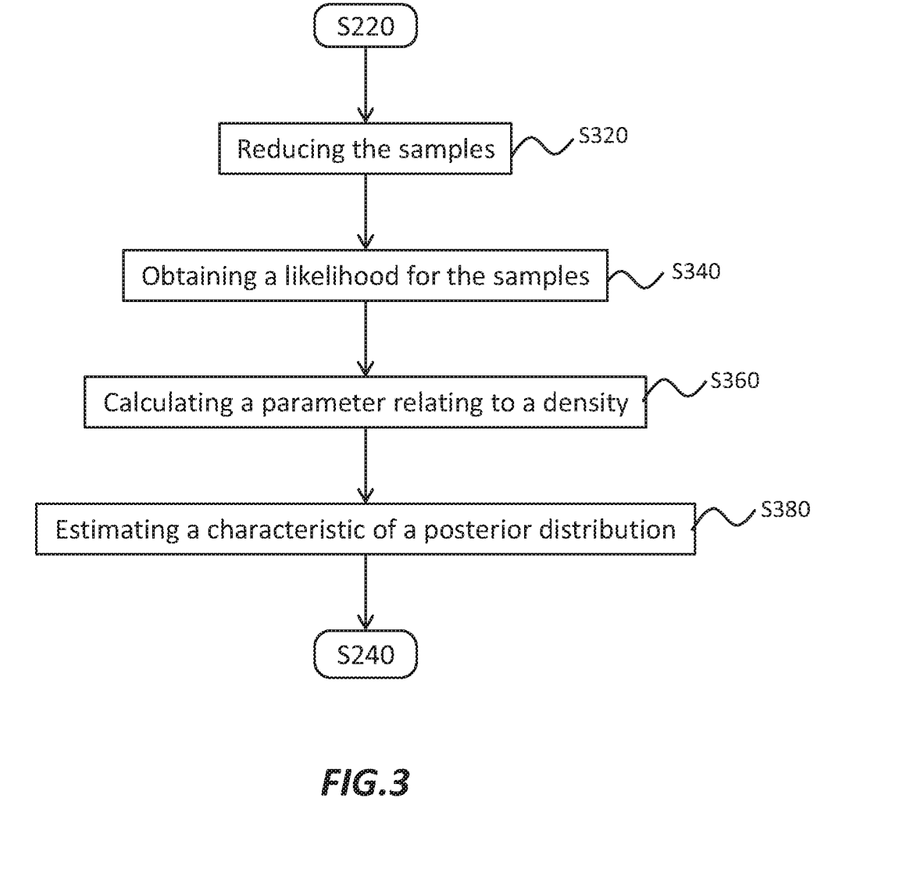
FIG. 3 shows a method for estimating a characteristic of a posterior distribution, according to an embodiment.

FIG. 3 shows an operational flow of a characteristic estimation, such as the estimation at S230 in FIG. 2, according to an embodiment of the present invention. The present embodiment describes an example in which an apparatus, such as the apparatus 100, performs the characteristic estimation by the operations from S320 to S380 shown in FIG. 3.

First, at S320, a reduction section, such as the reduction section 130, may reduce the samples that will be used for a calculation by a calculation section, such as the calculation section 140, at S360, by eliminating samples based on a likelihood of observation for each sample. In one embodiment, the reduction section may eliminate sample(s) $X_i$ that have a likelihood $p(D_m|X_i)$ that is less than a threshold likelihood $L_{TH}$, from the plurality of samples X generated at S210. Hereinafter, the remaining samples are referred to as "samples X'." The reduction section may provide the calculation section with samples X'. The reduction section may enable the estimation section to estimate the characteristic of the posterior distribution with even less computational resources.

In some embodiments, the apparatus may skip the process of S320, and the sampling section may provide the calculation section with samples X. In such embodiment, samples X are used instead of samples X' in following steps S340-S360.

Next, at S340, an obtaining section, such as the obtaining section 120, may obtain, for each sample $X_i$ among samples X', a likelihood of observation $p(D_m|X_i)$ given the sample $X_i$. In one embodiment, the obtaining section may read a value of the likelihood of observation $p(D_m|X_i)$ stored at S220 from the storage section 190 for only samples X'.

Next, at S360, a calculation section may calculate a parameter relating to a density at each sample in the prior distribution. In one embodiment, the density may be a density of the prior distribution at each sample. The calculation section may calculate the parameters relating to the densities based on the distance between samples X'.

In one embodiment, the calculation section may calculate a distance from each sample in samples X' to at least one neighboring sample in samples X' as the parameter relating to the density. For example, the calculation section may calculate a distance $R^k_i$ from a sample $X_i$ having k (k is a natural number) dimensions in the sample space to the nearest neighbor $X_j$, by a formula $R^k_i = \min \|X_j - X_i\|_2$, for samples X'. In another embodiment, the calculation section may calculate a distance $R^k_i$ from each sample in samples X' to a $k^{th}$-nearest neighbor as the parameter relating to the density. The calculation section may provide an estimation section, such as the estimation section 150, with the parameter relating the density.

Next, at S380, the estimation section may estimate a characteristic of the posterior distribution based on the parameter relating to the density at each sample, calculated at S360, and the likelihood of observation for each sample, obtained at S340. In one embodiment, the estimation section may estimate a differential entropy H^ as the characteristic of the posterior distribution based on the distance $R^k_i$ at each sample $X_i$ of samples X' and the likelihood of observation $p(D_m|X_i)$ of each sample $X_i$ of samples X'.

The estimation section may estimate the differential entropy H^ by approximating a probability density function f(x) of the prior distribution at each sample $X_i$ using a volume of a sphere having a radius equal to the distance $R^k_i$. Thereby, the estimation may approximate the function f(x) while the exact expression of f(x) may be unknown. The estimation section may estimate the differential entropy H^ having Euler's constant as a constant term.

In particular, the estimation section estimates the differential entropy $H^{\hat{}}_n(g(\cdot|D))$ of the posterior distribution $g(\cdot|D)$ according to formula (45), illustrated below, where γ is a constant term, which may be Euler's constant (0.5772 . . . ). L^, T^ and G^ in the formula (45) are defined in the formulae (46)-(48) where Γ(·) is a gamma function.

$$\hat{H}_n(g(\cdot \mid D)) = \log \hat{L} - \frac{\hat{T} + \hat{G}}{\hat{L}} + \gamma, \quad (45)$$

$$\hat{L} \equiv \frac{1}{n}\sum_{i=1}^{n} p(D \mid X_i) \quad (46)$$

$$\hat{G} \equiv \frac{1}{n}\sum_{i=1}^{n} p(D \mid X_i) \log p(D \mid X_i) \quad (47)$$

$$\hat{T} \equiv -\frac{1}{n}\sum_{i=1}^{n} p(D \mid X_i) \log \frac{nR_i^k \pi^{\frac{k}{2}}}{\Gamma\left(\frac{k}{2}+1\right)} \quad (48)$$

As described in formulas (45)-(48), the estimation section can estimate the differential entropy H^ of the posterior distribution based on samples X from the prior distribution, without sampling from the posterior distribution for each observation. How to derive formulas (45)-(48) will be explained in further detail below. The estimation section may output the estimated differential entropy H^. For example, the estimation section may display the differential entropy H^ on a screen of the apparatus.

According to formulas (45)-(48), if $p(D|X_i)$ is zero (0) or near zero (0), then $p(D|X_i)$ does not significantly contribute to L^, G^, and T^. Therefore, the reduction section eliminates sample(s) that have $p(D|X_i)$ lower than the threshold, thereby avoiding calculation of $R^k_i$ of such samples to reduce computational resource consumption.

Figure 4:
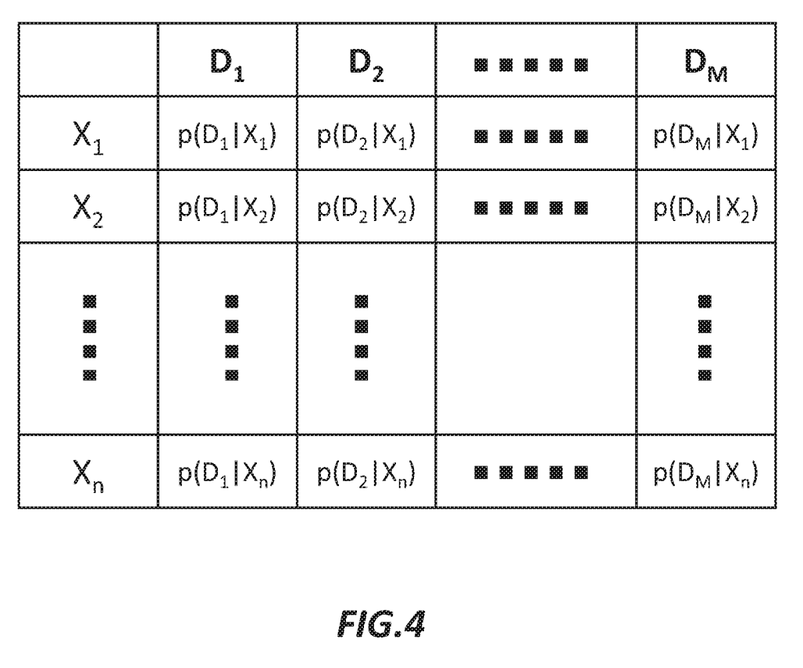
FIG. 4 shows a table of samples, according to an embodiment.

FIG. 4 shows a table of samples according to an embodiment of the present invention. In the embodiment of FIG. 4, a sampling section, such as sampling section 110, may generate samples $X_1, X_2, \ldots, X_n$. Each sample may have a feature vector having k elements (e.g., k scholar values). The obtaining section may obtain the likelihood of each observation for each sample based on the likelihood function. For example, the obtaining section may obtain $p(D_1|X_1)$, which is a likelihood that an observation $D_1$ may be made on the condition of $X_1$, $p(D_2|X_1)$ which is a likelihood that an observation $D_2$ may be made on the condition of $X_1$, . . . , and $p(D_M|X_1)$ which is a likelihood that an observation $D_M$ may be made on the condition of $X_1$. The obtaining section may also obtain a likelihood of samples $X_2, \ldots, X_n$ similarly.

The reduction section may eliminate samples having a likelihood $p(D|X_i)$ that is less than a threshold likelihood $L_{TH}$. For example, if the likelihood $p(D_1|X_2)$ is less than the threshold likelihood $L_{TH}$, then the reduction section may eliminate the sample $X_2$ from the samples to form the remaining samples, or samples X', for estimating the differential entropy of the posterior distribution corresponding to the observation $D_1$.

Figure 5:
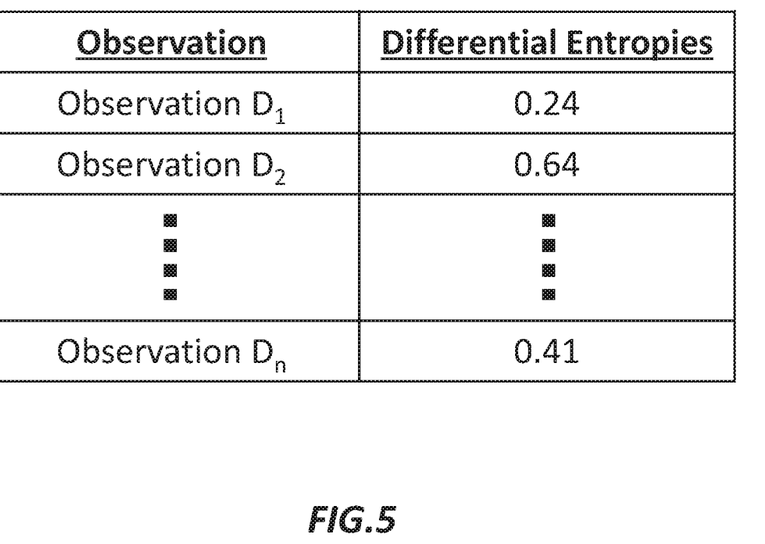
FIG. 5 shows a table of differential entropy, according to an embodiment.

FIG. 5 shows a table of differential entropy according to an embodiment of the present invention. An estimation section, such as estimation section 150, may estimate values of differential entropy of the posterior distributions for a plurality of observations $D_1, \ldots, D_n$, by iterations of the loop of S225-S240. In the embodiment of FIG. 5, the estimation section may estimate a differential entropy for the posterior distribution for each of the observations $D_1, D_2, \ldots, D_n$, in the iteration of the loop of S225-S240. A selecting section, such as the selecting section 160, may select the action that has the lowest expected value of the differential entropies of observations (e.g., an action $A_1$ that can cause the observation $D_1$ having a differential entropy of 0.24 and the observation $D_n$ having a differential entropy of 0.41).

Here, we will explain how to derive formulas (46)-(48). Supposing that an observation D is made for a target (e.g., a user or a group of users) that has parameters x, such as a feature vector, the posterior distribution of the parameters x has the following probability density function (PDF) g(x|D), wherein f(x) represents a PDF of a prior distribution of samples x:

$$g(x \mid D) = \frac{p(D \mid x) f(x)}{\int p(D \mid \tilde{x}) f(\tilde{x}) d\tilde{x}}, \quad (1)$$

where p(D|x) is the likelihood of D given x. The differential entropy $H_D$ of the posterior distribution is represented as follows:

$$H_D = -\int g(x|D) \log g(x|D) dx \quad (2)$$

It is assumed that the exact expression of g(·|D) is either unknown or analytically intractable, while it is possible to access to a set of samples, $X_1, \ldots X_n$ from the prior distribution and to evaluate p(D|x) for a given x. By formula (1) and formula (2), the following formulas (3)-(6) are derived:

$$H_D = -\int \frac{p(D \mid x) f(x)}{\int p(D \mid \tilde{x}) f(\tilde{x}) d\tilde{x}} \log \frac{p(D \mid X) f(x)}{\int p(D \mid \tilde{x}) f(\tilde{x}) d\tilde{x}} dx \quad (3)$$

$$= \frac{1}{\int p(D \mid \tilde{x}) f(\tilde{x}) d\tilde{x}} \int p(D \mid x) f(x) \quad (4)$$

$$\left( \log \int p(D \mid \tilde{x}) f(\tilde{x}) d\tilde{x} - \log p(D \mid x) f(x) \right) dx$$

$$= \frac{\int p(D \mid x) f(x) dx}{\int p(D \mid \tilde{x}) f(\tilde{x}) d\tilde{x}} \log \int p(D \mid \tilde{x}) f(\tilde{x}) d\tilde{x} - \quad (5)$$

$$\frac{\int p(D \mid x) f(x) \log p(D \mid x) f(x) dx}{\int p(D \mid \tilde{x}) f(\tilde{x}) d\tilde{x}}$$

$$= \log \int p(D \mid \tilde{x}) f(\tilde{x}) d\tilde{x} - \frac{\int p(D \mid x) f(x) \log p(D \mid x) dx + \int p(D \mid x) f(x) \log f(x) dx}{\int p(D \mid \tilde{x}) f(\tilde{x}) d\tilde{x}} \quad (6)$$

Let $E_f[\cdot]$ be the expectation with respect to the prior distribution. Let X be a random variable having the prior distribution, such as a sample from the prior distribution. Then, formulas (7)-(9) are derived.

$$\int p(D|x) f(x) dx = E_f[p(D|X)] \quad (7)$$

$$\int p(D|x) f(x) \log p(D|x) dx = E_f[p(D|X) \log p(D|X)] \quad (8)$$

$$\int p(D|x) f(x) \log f(x) dx = E_f[p(D|X) \log f(X)] \quad (9)$$

By formulas (6)-(9), formula (10) is derived:

$$H_D = \log E_f[p(D \mid X)] - \frac{E_f[p(D \mid X) \log p(D \mid X)] + E_f[p(D \mid X) \log f(X)]}{E_f[p(D \mid X)]} \quad (10)$$

The unbiased estimator of formula (7) is given by:

$$\hat{L}_n \equiv \frac{1}{n} \sum_{i=1}^{n} p(D \mid X_i). \quad (11)$$

The unbiased estimator of formula (8) is given by $$\hat{G}_n \equiv \frac{1}{n} \sum_{i=1}^{n} p(D \mid X_i) \log p(D \mid X_i). \quad (12)$$

To estimate formula (9), the idea of nearest neighbor estimator of the differential entropy is used. Let:

$$R_i \equiv \min_{j \neq i} \|X_j - X_i\|_2 \quad (13)$$

be the distance from $X_i$ to its nearest neighbor. Let:

$$V(r) \equiv \frac{r^k \pi^{\frac{k}{2}}}{\Gamma(k/2 + 1)} \quad (14)$$

be the volume of a sphere with radius r in a k-dimensional space. The density, $f(X_i)$, may approximately satisfy:

$$f(X_1) V(R_1) \approx \ldots \approx f(X_n) V(R_n) \approx \frac{1}{n}. \quad (15)$$

A reasonable estimator of formula (9) is then given by:

$$\hat{T}_n \equiv \frac{1}{n} \sum_{i=1}^{n} p(D \mid X_i) \log \frac{1}{nV(R_i)} \quad (16)$$

$$= -\frac{1}{n} \sum_{i=1}^{n} p(D \mid X_i) \log \frac{nR_i^k \pi^{\frac{k}{2}}}{\Gamma(k/2 + 1)}. \quad (17)$$

However, $\hat{T}_n$ is biased even asymptotically. To see the bias, let:

$$U_n \equiv p(D \mid X_1) \log \frac{nR_i^k \pi^{\frac{k}{2}}}{\Gamma(k/2 + 1)}. \quad (18)$$

so that $E_f[\hat{T}_n] = -E_f[U_n]$. Observe that:

$$Pr(U_n > r \mid X_1 = x) = Pr\left( p(D \mid x) \log \frac{nR_1^k \pi^{\frac{k}{2}}}{\Gamma(k/2 + 1)} > r \mid X_1 = x \right) \quad (19)$$

$$= Pr\left( R_1 > \left( \frac{e^{\frac{r}{p(D|x)}} \Gamma(k/2 + 1)}{n \pi^{\frac{k}{2}}} \right)^{\frac{1}{k}} \mid X_1 = x \right) \quad (20)$$

$$= (1 - P_f(S_{x,\rho(x)}))^{n-1}, \quad (21)$$

where $P_f(S_{x,\rho(x)})$ denotes the probability that a sample from the prior distribution is within the sphere with center x and radius $\rho(x)$, where:

$$\rho(x) \equiv \left(\frac{e^{\frac{r}{p(D|x)}}\Gamma(k/2+1)}{n\pi^{\frac{k}{2}}}\right)^{\frac{1}{k}} \tag{22}$$

If $n \to \infty$, then $\rho(x) \to 0$, so that, if f is continuous, then:

$$Pr(U_n > r \mid X_1 = x) \to (1 - f(x)V(\rho(x)))^{n-1} \tag{23}$$

$$= \left(1 - f(x)\frac{\rho(x)^k \pi^{\frac{k}{2}}}{\Gamma(k/2+1)}\right)^{n-1} \tag{24}$$

$$= \left(1 - f(x)\frac{e^{\frac{r}{p(D|x)}}\Gamma(k/2+1)}{n\pi^{\frac{k}{2}}}\frac{\pi^{\frac{k}{2}}}{\Gamma(k/2+1)}\right)^{n-1} \tag{25}$$

$$= \left(1 - \frac{1}{n}f(x)e^{\frac{r}{p(D|x)}}\right)^{n-1} \tag{26}$$

$$\to e^{-f(x)e^{\frac{r}{p(D|x)}}}. \tag{27}$$

The corresponding PDF (of $U_n$ given $X_1=x$) is then given by:

$$h(r \mid x) = -\frac{\partial}{\partial r}Pr(U_n > r \mid X_1 = x) \tag{28}$$

$$= \frac{f(x)}{p(D \mid x)}e^{\frac{r}{p(D|x)}}e^{-f(x)e^{\frac{r}{p(D|x)}}} \tag{29}$$

Therefore, applying a boundary of $n \to \infty$ yields:

$$E_f[U_\infty \mid X_1 = x] = \int_{-\infty}^{\infty} rh(r \mid x)dr \tag{30}$$

$$= \int_{-\infty}^{\infty} r\frac{f(x)}{p(D \mid x)}e^{\frac{r}{p(D|x)}}e^{-f(x)e^{\frac{r}{p(D|x)}}} dr \tag{31}$$

Changing variables such that:

$$y = f(x)e^{\frac{r}{p(D|x)}} \tag{32}$$

$$dy = \frac{f(x)}{p(D \mid x)}e^{\frac{r}{p(D|x)}}dr, \tag{33}$$

yields:

$$E_f[U_\infty \mid X_1 = x] = \int_{-\infty}^{\infty} rh(r \mid x)dr \tag{34}$$

$$= \int_0^\infty p(D \mid x)(\log y - \log f(x))e^{-y}dy \tag{35}$$

$$= p(D \mid x)\int_0^\infty \log y e^{-y}dy - p(D \mid x)\log f(x)\int_0^\infty e^{-y}dy \tag{36}$$

$$= -\gamma p(D \mid x) - p(D \mid x)\log f(x), \tag{37}$$

where $\gamma$ is Euler's constant. Applying the boundary of $n \to \infty$ yields:

$$E_f[U_\infty] = E_f[E_f[U_\infty \mid X_1]] \tag{38}$$

$$= -\gamma E_f[p(D \mid X)] - E_f[p(D \mid X)\log f(X)] \tag{39}$$

Therefore, $$E_f[\hat{T}_n] = -E_f[U_n] \to E_f[p(D|X)]\gamma + E_f[p(D|X)\log f(X)] \tag{40}$$

An asymptotically unbiased estimator of the formula (9) thus turns out to be:

$$\hat{T}_n - \gamma \hat{L}_n \tag{41}$$

To summarize, an asymptotically unbiased estimator of $H_D$ is:

$$\hat{H}_D = \log \hat{L}_n - \frac{\hat{G}_n + \hat{T}_n - \gamma \hat{L}_n}{\hat{L}_n} \tag{42}$$

$$= \log \hat{L}_n - \frac{\hat{G}_n + \hat{T}_n}{\hat{L}_n} + \gamma \tag{43}$$

Therefore, the following formula (45) has been derived:

$$\hat{H}_n(g(\cdot \mid D)) = \log \hat{L} - \frac{\hat{T} + \hat{G}}{\hat{L}} + \gamma, \tag{45}$$

where $$\hat{L} \equiv \frac{1}{n}\sum_{i=1}^{n} p(D \mid X_i) \tag{46}$$

$$\hat{G} \equiv \frac{1}{n}\sum_{i=1}^{n} p(D \mid X_i)\log p(D \mid X_i) \tag{47}$$

$$\hat{T} \equiv -\frac{1}{n}\sum_{i=1}^{n} p(D \mid X_i)\log \frac{nR_i^k \pi^{\frac{k}{2}}}{\Gamma\left(\frac{k}{2}+1\right)} \tag{48}$$

and $\gamma=0.5772\ldots$ (Euler's constant). Therefore, $\hat{H}_n(g(\cdot|D))$ is an asymptotically unbiased estimator of $H(g(\cdot|D))$. That is, $$\lim_{n \to \infty} E_f[\hat{H}_n(g(\cdot \mid D))] = H(g(\cdot \mid D)). \tag{49}$$

Figure 6:
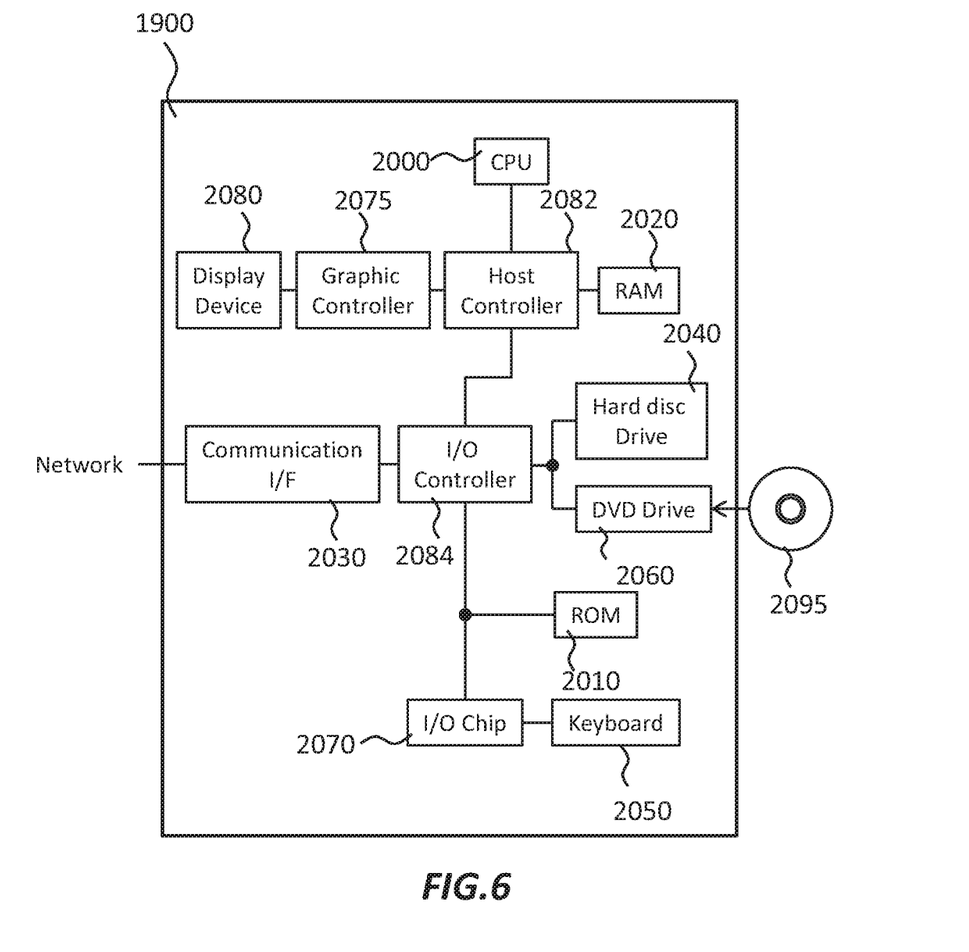
FIG. 6 shows an overall functional block diagram of a computer system hardware for estimating a characteristic of a posterior distribution, according to an embodiment of the present invention.

FIG. 6 shows an exemplary configuration of a computer 1900 according to an embodiment of the invention. The computer 1900, according to the present embodiment, includes a computer processing unit (CPU) 2000, a RAM 2020, a graphics controller 2075, and a display apparatus 2080, which are mutually connected by a host controller 2082. The computer 1900 also includes input/output units, such as a communication interface 2030, a hard disk drive 2040, and a DVD-ROM drive 2060, which are connected to the host controller 2082 via an input/output controller 2084. The computer also includes legacy input/output units, such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer, or the like, provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program, or the like, executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program is installed in the computer 1900 and causes the computer 1900 to function as an apparatus, such as the apparatus 100 of FIG. 1. The program or module acts on the CPU 2000, to cause the computer 1900 to function as a section, component, element such as each element of the apparatus 100 of FIG. 1 (e.g., the sampling section 110, the obtaining section 120, the reduction section 130, the calculation section 140, the estimation section 150, the selecting section 160, the interaction section 170, the observation section 180 and the like).

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a direct memory access (DMA) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section 190, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize the apparatus for the optimization of predictor variables.

What is claimed is:

1. An apparatus for implementing a computing system to predict preferences, comprising:
    at least one processor device operatively coupled to a memory and configured to:
    calculate a parameter relating to a density of a prior distribution at each sample of a set of samples associated with the prior distribution, the at least one parameter including a distance from each sample to at least one neighboring sample;
    estimate, for the plurality of samples, at least one differential entropy of at least one posterior distribution associated with at least one observation based on the parameter relating to the density of the prior distribution at each sample and a likelihood of observation for each sample, the estimation being performed without sampling the at least one posterior distribution to reduce consumption of resources of the computing system,
    select an action from a plurality of candidate actions each causing one or more observations, the action being selected based on expected values of the estimated at least one differential entropy; and
    transmit, to at least one device associated with at least one person, at least one electronic interaction generated based on the action.

2. The apparatus of claim I, wherein the at least one processor device is further configured to:
    generate a plurality samples from the prior distribution;
    obtain, for each sample among the plurality of samples, a likelihood of an observation as an output of a likelihood function given the sample; and
    eliminate samples from the plurality of samples having a likelihood less than a threshold value to generate the set of samples.

3. The apparatus of claim 1, wherein the distance from each sample to at least one neighboring sample is a distance from each sample to a $k^{th}$-nearest neighbor, k being a natural number.

4. The apparatus of claim 1, wherein the at least one processor device is further configured to estimate the at least one differential entropy of the at least one posterior distribution by approximating a probability density function of the prior distribution at each sample using a volume of a sphere having a radius equal to the distance.

5. The apparatus of claim 1, wherein the at least one processor device is further configured to estimate the at least one differential entropy of the at least one posterior distribution having Euler's constant as a constant term.

6. The apparatus of claim 1, wherein the at least one processor device is further configured to estimate the at least one differential entropy of each of a plurality of posterior distributions based on the at least one parameter relating to the density at each sample and a likelihood of transition for each sample from the prior distribution to each posterior distribution, and wherein each likelihood of transition exceeds a threshold likelihood.

7. The apparatus of claim 1, wherein the at least one processor device is further configured to obtain the at least one observation from a model having an internal state estimated by the prior distribution.

8. The apparatus of claim 7, wherein the model is a behavioral model of at least one person.

9. The apparatus of claim 1, wherein the action from the plurality of candidate actions each causing one or more observations is selected based on expected values of the differential entropies estimated for all observations caused by the action.

10. A computer-implemented method for implementing a computer system to predict preferences, comprising:
    calculating a parameter relating to a density of a prior distribution at each sample of a set of samples associated with the prior distribution, the at least one parameter including a distance from each sample to at least one neighboring sample;
    estimating, for the plurality of samples, at least one differential entropy of at least one posterior distribution associated with at least one observation based on the parameter relating to the density of the prior distribution at each sample and a likelihood of observation for each sample, the estimation being performed without sampling the at least one posterior distribution to reduce consumption of resources of the computing system;
    selecting an action from a plurality of candidate actions each causing one or more observations, the action being selected based on expected values of the estimated at least one differential entropy; and
    transmitting, to at least one device associated with at least one person, at least one electronic interaction generated based on the action.

11. The method of claim 10, further comprising:
    generating a plurality samples from the prior distribution;
    obtaining, for each sample among the plurality of samples, a likelihood of an observation as an output of a likelihood function given the sample; and
    eliminating samples from the plurality of samples having a likelihood less than a threshold value to generate the set of samples.

12. The method of claim 10, wherein the distance from each sample to at east one neighboring sample is a distance from each sample to a $k^{th}$-nearest neighbor, k being a natural number.

13. The method of claim 10, wherein estimating the at least one differential entropy of the at least one posterior distribution further includes approximating a probability density function of the prior distribution at each sample using a volume of a sphere having a radius equal to the distance.

14. The method of claim 10, wherein the at least one differential entropy of the at least one posterior distribution is estimated having Euler's constant as a constant term.

15. The method of claim 10, wherein the at least one differential entropy of each of a plurality of posterior distributions is estimated based on the at least one parameter relating to the density at each sample and a likelihood of transition for each sample from the prior distribution to each posterior distribution, and wherein each likelihood of transition exceeds a threshold likelihood.

16. The method of claim 10, wherein the at least one processor device is further configured to obtain the at least one observation from a model having an internal state estimated by the prior distribution.

17. The method of claim 16, wherein the model is a behavioral model of at least one person.

18. The method of claim 10, wherein the action from the plurality of candidate actions each causing one or more observations is selected based on expected values of the differential entropies estimated for all observations caused by the action.

19. A computer program product for implementing a computer system to predict preferences, the computer program product comprising a non-transitory computer readable storage medium having program instructions embodied therewith, the program instructions executable by a computer to cause the computer to perform operations comprising:
    calculating a parameter relating to a density of a prior distribution at each sample of a set of samples associated with the prior distribution, the at least one parameter including a distance from each sample to at least one neighboring sample;
    estimating, for the plurality of samples, at least one differential entropy of at least one posterior distribution associated with at least one observation based on the parameter relating to the density of the prior distribution at each sample and a likelihood of observation for each sample, the estimation being performed without sampling the at least one posterior distribution to reduce consumption of resources of the computing system;
    selecting an action from a plurality of candidate actions each causing one or more observations, the action being selected based on expected values of the estimated at least one differential entropy; and
    transmitting, to at least one device associated with at least one person, at least one electronic interaction generated based on the action.

20. The computer program product of claim 19, wherein the operations further include:
    generating a plurality samples from the prior distribution;
    obtaining, for each sample among the plurality of samples, a likelihood of an observation as an output of a likelihood function given the sample;
    eliminating samples from the plurality of samples having a likelihood less than a threshold value to generate the set of samples; and
    transmitting, to at least one device associated with at least one person, at least one electronic interaction generated based on the action,
    wherein the action from the plurality of candidate actions each causing one or more observations is based on expected values of the differential entropies estimated for all observations caused by the action.

* * * * *